United States Patent [19]

Neri et al.

[11] 4,107,683
[45] Aug. 15, 1978

[54] DEVICE FOR CONTROLLING THE CONICAL SCANNING FREQUENCY FOR CONICAL SCANNING RADAR SYSTEMS

[75] Inventors: Filippo Neri; Alfredo Albrande, both of Rome, Italy

[73] Assignee: Selenia-Industrie Elettroniche Associate S.p.A., Italy

[21] Appl. No.: 777,813

[22] Filed: Mar. 15, 1977

[30] Foreign Application Priority Data

Sep. 16, 1976 [IT] Italy ............................. 51310 A/76

[51] Int. Cl.² ............................................. G01S 7/36
[52] U.S. Cl. .................................................. 343/18 E
[58] Field of Search ...................................... 343/18 E

[56] References Cited

U.S. PATENT DOCUMENTS 3,947,847   3/1976   Feisenthal, Jr. ................... 343/18 E

*Primary Examiner*—T.H. Tubbesing

*Attorney, Agent, or Firm*—Beveridge, De Grandi, Kline & Lunsford

[57] ABSTRACT

A device for controlling the conical scanning frequency of conical scanning radar systems. An antenna illuminator is caused to revolve by means of a three-phase asynchronous rotary field motor. The angular frequency of conical scanning is changed in a random or pseudo-random manner by means of a reference generator associated with the asynchronous motor, a random or pseudo-random signal generator, and a circuit comparing the signal of the reference generator and the signal of the signal generator. The comparison circuit provides "greater," "less" and "equal" outputs. A switching device driven by those outputs couples a braking magnetic-field or the three-phase supply to the motor, depending upon whether a "greater" or "less" output, respectively is the present comparison circuit. The "equal" output also controls the change of state for the random or pseudo-random signal generator.

3 Claims, 3 Drawing Figures

DEVICE FOR CONTROLLING THE CONICAL SCANNING FREQUENCY FOR CONICAL SCANNING RADAR SYSTEMS

The present invention relates to a system for controlling the conical scaning frequency of conical scanning radar systems.

Radar systems for military use, such as radar systems for naval fire control require high precision and low weight and a high insensitivity to intentional electronic jamming, such as electronic countermeasures (ECM) generated by the target area.

In a conical scanning radar system, the various measures which can be used to avoid EMC, included the possibility of changing, possibly in an incoherent way (random or pseudo-random), the angular frequency of the conical scanning. Besides this capability, the conical scanning radar system should have the capability, in other circumstances, of having a stabilized frequency of conical scanning for use when the radar system co-operates with a missile guide system (beam rider or the like).

Normally, conical scanning is achieved by having a "feed" or antenna illuminator rotated, by means of an asynchronous rotary field motor (three-phase) which can be fed directly by power generators.

In order to obtain conical scanning with random variation of the frequency in such a system therefore is necessary to control the speed of rotation of the asynchronous motor which operates the illuminator.

Of course as these radars are often mounted on relatively small boats, it is necessary that the control system have a small weight with respect to the radar apparatus.

It is known that the speed of rotation of an asynchronous motor depends, assuming a constant braking torque, upon the frequency of the feeding current. Consequently up to now it has been deemed convenient to control the speed of an asynchronous motor by means of generators or inverters feeding the motor with a variable frequency current. However, generator units are very heavy rotary machines generally including a motor fed by a direct current to operate an alternator. The power normally required results is units weighing in the order of 100 kgs, (which corresponds to about 25% of the weight of the entire radar). Also the inverters require circuitry which is rather complex and expensive and which for the required power, weighs 20 – 30 kgs.

The present invention, involves varying the "slipping" co-efficient of a three-phase asynchronous motor which operates the illuminator. This is achieved by introducing a braking torque which is preferably created in the motor itself and which is variable in function in a random or pseudo-random manner and is produced by a known type generator of random or pseudo-random sequences.

According to another aspect of the present invention, the random variation system for controlling the speed of conical scanning can be used as stabilizer of said speed.

The present invention will be now described with reference to one embodiment thereof, disclosed by way of non limitative example and with reference to the attached drawings wherein.

Figure 1:
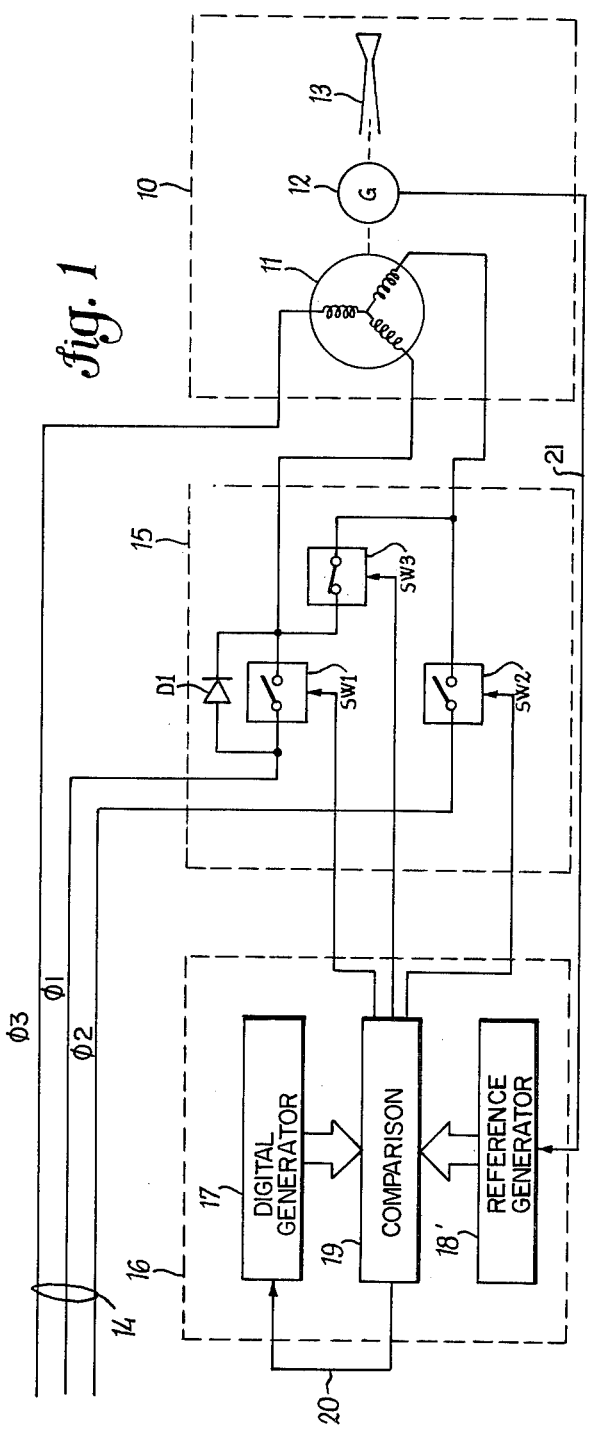
FIG. 1 shows the basic electric diagram of the device according to this invention for controlling the conical scanning frequency or speed.

With reference to FIG. 1, the numeral reference 10 diagrammatically dipicts the operating unit for the illuminator of a conical scanning radar antenna, unit 10 includes a three-phase asynchronous motor 11 of conventional squirrel cage type, coupled to a reference generator 12 and mechanically coupled to an illuminator 13 for the antenna (not shown) of a conical scanning radar.

Motor 11 is fed by the three-phase line 14 through a control module 15. The control module 15 receives signals coming from a control generating unit 16.

The control generating converter unit comprises a generator 17 of random or pseudo-random digital sequences, on line 21 from a known type, a unit 18 for converting the signal of the reference generator 12 into a digital word, and a digital comparison unit 19.

The digital comparison circuit 19 produces a signal on the line 20 when the digital word supplied by the unit 18 is equal to the digital word supplied by the random generator 17. This equality denotes that the conical scanning frequency corresponds to a certain pattern supplied by the generator 17. In this case the signal present on the line 20 causes the pattern of the generator 17 to be changed, and generator 17 generates a new digital word.

The comparison circuit 19, also supplies control signals to the switches SW1, SW2, SW3 which, in co-operation with the diode D1, control the acceleration or deceleration of the motor 11 under the control of the generator 17. Of course, if a fixed digital signal source is substituted for the generator 17, the arrangement according to this invention forms a precision speed regulator to maintain a constant frequency of the conical scanning, when this is required.

Figure 2A:
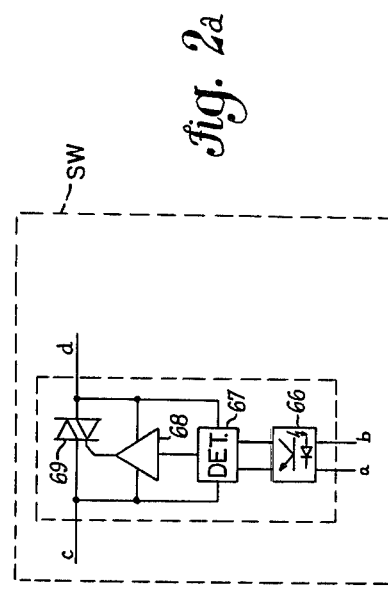
FIG. 2a shows a detailed diagram of one component of FIG. 2.
Figure 2:
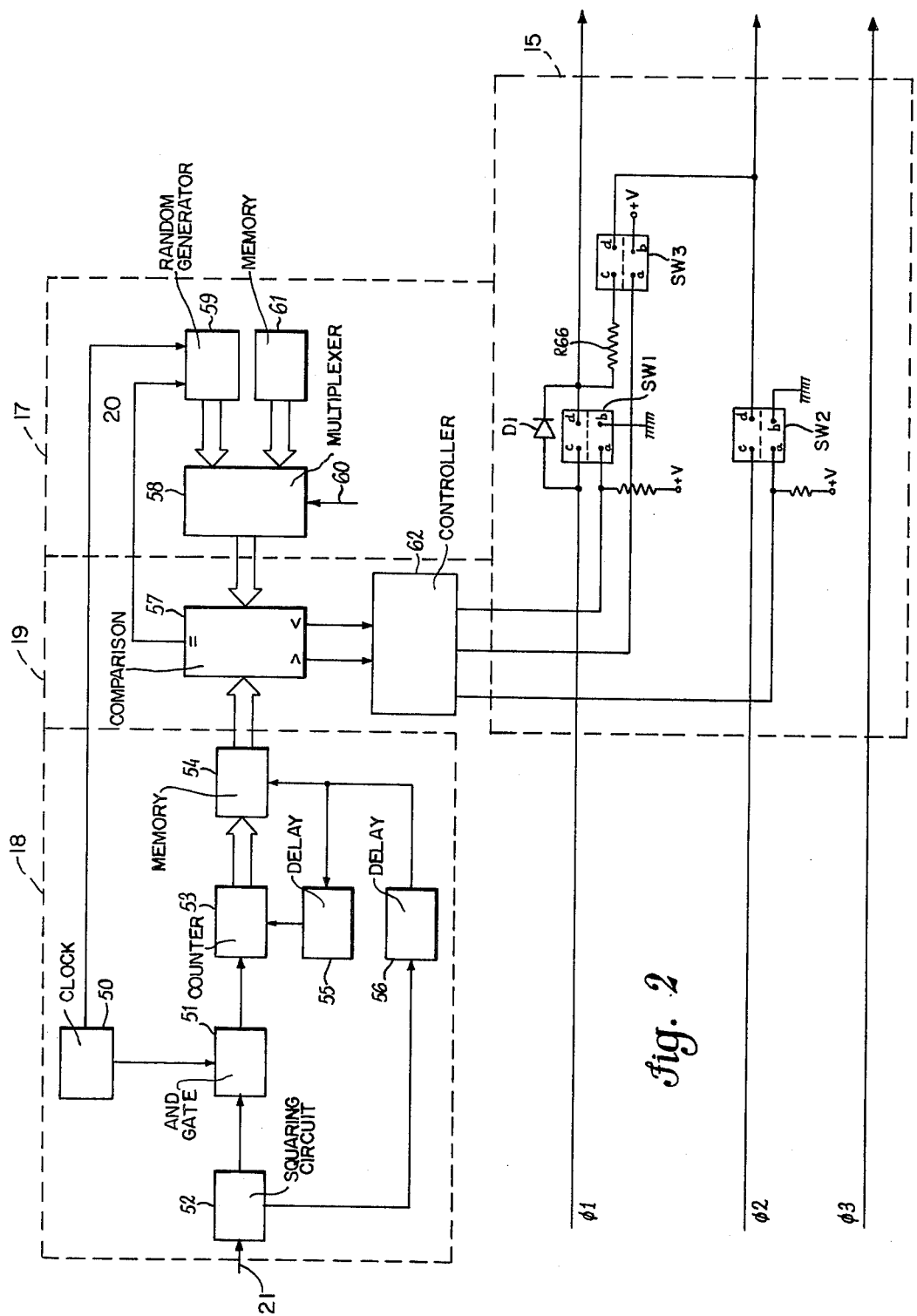
FIG. 2 shows a detailed diagram corresponding to that of FIG. 1.

With reference to FIG. 2, a preferred embodiment of the control circuitry, as diagrammatically described with reference to FIG. 1, will be described in detail.

The frequency/digital converter comprises a clock generator 50 operating, for instance, at a frequency of 23 KH$_2$. The clock signal is carried from the generator 50 to an AND gate or enabling circuit 51 which is driven by the output of a squarer 52 controlled by the tachometric reference signal received on line 21 from the illuminator 10 of the radar antenna. At the output from the enabling circuit 51, pulse groups are present, with the number of pulses in each group depending upon the speed of rotation of the motor 11. The number of pulses in each group is counted by the counter 53 which supplies a digital word which is stored in the digital memory 54. The memory 54 and the counter 53 are controlled by the squarer 52 through delay circuits 55, 56 as shown in FIG. 2.

Thus, at the output from the memory 54 there is available a digital word strictly correlated to the speed of rotation of the motor 11 operating the scanning antenna. This digital word is applied to a first input of the digital comparison circuit 57 of unit 19. At the other input of the digital comparison circuit 57 there applied a digital word from multiplexer 58 within digital generator 17. A first input of multiplexer 58 is connected to a generator of random or pseudo-random words 59, which receives a clock signal from the clock generator 50 and a control signal from the "equal" output on line 20 from digital comparison circuit 57. A second input of multiplexer 58 is connected to a memory 61 which stores a fixed digital word.

Multiplexer 58 also has a control input 60. When no signal is present on control input 60, multiplexer 58 couples random generator 59 to comparison circuit 57. When a control signal is present at input 60, multiplexer 58 instead couples memory 61 to comparison circuit 57 so that comparison circuit 57 receives a fixed digital word supplied by a memory 61, and in this case the circuit becomes a stabilizer for the speed of rotation of the concerned motor.

The digital comparison circuit 57 has also a "greater" (>) output and a "less" (<) output driving the control circuits 62 for the solid state relays SW1, SW3, SW2 controlling the three-phase feeding to the motor.

As shown in FIG. 2a, the solid state relays SW1, SW3, SW2 comprise an optical-electronic coupler 66, a zero crossing detector 67 a trigger generator 68 and a triac 69, all interconnected in a way known to a person skilled in the art.

According to the state of the output controls from the control circuits 62, the relays SW1, SW3, SW2 are driven as follows:

| State of comparison circuit 57 | Condition | Switches |
|---|---|---|
| Greater (>) | braking | SW1, SW2 open SW3 closed[1] |
| Less (<) | accelerating | SW1, SW2 closed SW3 open[2] |
| equal (=) | braking or accelerating The pseudo-random generator changes its state. | |

[1]The diode D1 intervenes so that the motor receives a rectified phase-to-phase voltage causing a constant magnetic field exerting a braking action on the motor (Foucault currents);
[2]The three phase voltages φ1, φ2, φ3 are directly applied to the three-phase motor which accelerates towards its synchronism speed.

The resistor R 66 is provided in order to avoid possible "jitter" of the switching of the switches, SW1, SW3 that night cause the passage therethrough of too high peak currents which could damage or destroy said switches. It is clear that the system according to this invention can be applied in any field where the control of the speed of an asynchronous motor is required.

The present invention has been described with reference to one embodiment thereof at present preferred, but it will be understood that modifications or variations might be adopted by a person skilled in the art, without thereby departing from the scope of the present industrial privilege.

Having thus described the present invention, what is claimed is:

1. In a device for controlling the conical scanning frequency of a conical scanning radar system, wherein an antenna illuminator is caused to revolve by means of a three-phase asynchronous rotary field motor and comprising control means to change in an incoherent manner the angular frequency of conical scanning, the improvement in which said control means comprise a reference generator coupled to said asynchronous motor, a random or pseudo-random signal generator, and a comparison circuit for comparing the signal of said reference generator and the signal of said signal generator, said comparison circuit having "greater", "less" and "equal" outputs, first switching means driven by said outputs for imposing a braking magnetic field or the entire three-phase voltage, respectively, to said motor, in correspondence with a "greater" or a "less" output, respectively, from said comparison circuit, said "equal" output controlling a change of state for said random or pseudo-random signal generator.

2. In a device as claimed in claim 1 the further improvement comprising further switching means coupling said signal generator with said comparison circuit for providing a fixed signal to said comparison circuit instead of the variable output from said random or pseudo-random signal generator, in order to obtain stabilization of the angular frequency of conical scanning.

3. In a device as claimed in claim 1, the improvement in which said first switching means comprise solid state bidirectional switches.

* * * * *